ns Patent [19]

Marquis et al.

[11] 4,162,358

[45] Jul. 24, 1979

[54] POLYAROMATIC AMINE CURING AGENTS FOR EPOXY RESINS

[75] Inventors: Edward T. Marquis; Harold G. Waddill, both of Austin, Tex.

[73] Assignee: Texaco Development Corporation, White Plains, N.Y.

[21] Appl. No.: 937,364

[22] Filed: Aug. 28, 1978

[51] Int. Cl.$^2$ ............................................. C08G 59/50
[52] U.S. Cl. .............................. 528/120; 260/570 D; 528/107; 528/266; 528/269
[58] Field of Search ............... 528/107, 120, 266, 269, 528/407; 252/182; 260/570 D

[56] References Cited

U.S. PATENT DOCUMENTS

| | | | |
|---|---|---|---|
| 3,446,773 | 5/1969 | Schwarz | 260/47 |
| 3,600,362 | 8/1971 | Hirosawa | 260/37 EP |
| 3,852,240 | 12/1974 | Smith | 260/47 EP |
| 3,917,702 | 11/1975 | Hirosawa | 260/570 D |

*Primary Examiner*—Earl A. Nielsen
*Attorney, Agent, or Firm*—Carl G. Ries; Robert A. Kulason; James L. Bailey

[57] ABSTRACT

A liquid methylene bridged polyaromatic amine curing agent for vicinal epoxide resins with high amine content is prepared by reacting an aromatic amine mixture of aniline containing two to eight mole percent of a mononuclear aromatic diamine having the amine groups bonded to nonadjacent carbon atoms of the aromatic ring, with formaldehyde. The resulting methylene bridged polyaromatic amine curing agent produces a cured epoxy resin having a higher heat distortion temperature than conventional curing agents produced by the reaction of aniline alone with formaldehyde.

15 Claims, No Drawings herein incorporated by reference as illustrations of suitable catalysts. The preferred catalyst is a silica alumina cracking catalyst (American Cyanamid Company). It is preferred, although not essential, to use from about 1.8 to 2.2 weight percent and, more particularly, 2 percent by weight of the silica-alumina catalyst, based upon the total amine charged.

Although the reaction will occur at temperatures from about 100° C. to about 300° C., it is preferable to conduct the reaction within a temperature range of from about 150° to 200° C. when the preferred silica alumina catalyst is used, and about 125° to about 130° C. when an acid treated clay is used. The catalyst, reaction conditions and operative steps of the method used are described in U.S. Pat. No. 4,071,558 for example, which is incorporated herein by reference.

The autogenous pressure developed during the course of the reaction depends upon the amounts of reactants charged, the volume of the reaction vessel and the temperature of reaction. Pressure is not critical, however it should be sufficient to maintain liquid phase reaction conditions.

Formaldehyde may be employed in any of its commercial forms, such as formalin, either inhibited or noninhibited, or paraformaldehyde, etc. The preferred mole ratio of total amine charged to formaldehyde is from about 2.5 to about 8. Formaldehyde in the form of formalin is preferred. The aniline used can be alkyl substituted with an alkyl group having from one to about six carbon atoms. Aniline or methyl aniline are preferred.

The essential feature of this invention is the use of a mononuclear aromatic diamine additive having the amine groups on nonadjacent carbon atoms of the aromatic ring (hereinafter referred to as the diamine) in the manufacture of the curing agent. The diamine may be monosubstituted with an alkyl group having from one to about four carbon atoms. The preferred diamines are m-phenylenediamine, p-phenylenediamine, 2,4-toluenediamine, 2,6-toluenediamine and mixtures thereof; and, more particularly m-phenylenediamine and 2,6-toluenediamine.

If a monsubstituted diamine is employed it is preferred to use one having a normal alkyl substituent having from 1 to about 4 carbon atoms.

Although diamines having adjacent amine groups, such as o-phenylenediamine and 3,4-toluenediamine, react with aniline under the above-stated conditions, it has been found that epoxy resins cured with the materials produced using these diamines as additives have a lower heat distortion temperature in all cases examined where the mole percentage of diamine in the aniline exceeded two. In cases where the mole percent is equal to two the heat distortion temperature was only slightly higher than those obtained by curing the resin with a material produced solely from aniline and formaldehyde (hereinafter sometimes referred to as a polyaniline).

The use of a diamine additive to produce a curing agent, as found in this invention, produces higher heat distortion temperatures in cured epoxide resins cannot be explained on the basis of the increased functionality of the polyaromatic amine material. It was found that an epoxy resin cured with a polyaromatic amine material of increased functionality, but produced without the aromatic diamines additives of this invention, had very similar heat distortion temperatures to that cured with a polyaniline.

The amount of the aromatic diamine added to aniline was also found to be essential to produce the materials of this invention. It was found that a range of from about two to about eight mole percent could be employed, preferably from about three to about five percent, although the specific ranges depend upon which diamine is used. It was found that the heat distortion temperature of a cured epoxy resin increased as the mole percent of diamine added in the polyaromatic amine forming reaction was increased.

Preferred amounts of diamine added vary as follows: for example, when m-phenylenediamine and aniline are used a mole percentage of from about two to about five; for 2,4-toluenediamine from about two to about eight; for p-phenylenediamine from about two to about eight; and for 2,6-toluenediamine from about two to about six.

Generally the vicinal epoxide compositions which can be cured using the curing agents of this invention are organic materials having an average of more than one reactive 1,2-epoxide groups. These polyepoxide materials can be monomeric or polymeric, saturated or unsaturated, aliphatic, cycloaliphatic, aromatic or heterocyclic, and may be substituted if desired with other substituents besides the epoxy groups, e.g. hydroxyl groups, ether radicals, aromatic halogen atoms and the like.

A widely used class of polyepoxides which can be cured according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylmethane, 4,4'-dihydroxydiphenylbutylphenylmethane, 2,2'-dihydroxydiphenylditolylmethane, 4,4'-dihydroxydiphenyltolylmethyl-methane and the like. Other polyhydric phenols which may also be co-reacted with an epihalohydrin to provide these epoxy polyethers are such compounds as resorcinol, hydroquinone, substituted hydroquinones, e.g., p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and high polymers, e.g. polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be cured by means of the above-described curing agents includes the epoxy novolac resins obtained by reacting, preferably, in the presence of a basic catalyst, e.g. sodium or potassium hydroxide, an epihalohydrin, such as epichlorohydrin, with the resinous condensate of an

POLYAROMATIC AMINE CURING AGENTS FOR EPOXY RESINS

BACKGROUND OF THE INVENTION

Epoxy resins constitute a broad class of polymeric materials having a wide range of physical characteristics. The resins are characterized by epoxide groups which are cured by reaction with certain catalysts, or curing agents, to provide cured epoxy resin compositions with certain desirable properties. The most commonly used curing agents are aliphatic amines such as diethylenetriamine, triethylenetetramine and the like.

When cured epoxy resins with improved heat and chemical resistance properties are desired an aromatic diamine such as 4,4'-methylene dianiline and m-phenylenediamine have been used. Prior to the invention described in U.S. Pat. No. 3,427,282 aromatic diamines and polyaromatic diamines had limited utility as epoxy curing agents because they were invariably solid materials which were mixed with the vicinal epoxides with considerable difficulty. The above-mentioned patent disclosed a curing agent for epoxy resins that could be used to eliminate some of the prior handling difficulties encountered with aromatic diamines. This curing agent consisted of 4,4'-methylene-bis(2-alkylanilines) wherein the alkyl substituent was an ethyl group or a secondary alkyl group having three to six carbons. It was found that curing agents composed of this material were readily blendable with liquid resins because the curing agents were either liquid, or solids which readily dissolved in the resins at processing temperatures. The use of this material as an epoxy resin curing agent gave cured resins having a lower heat distortion temperature than those cured with 4,4'-methylene dianiline and m-phenylenediamine.

U.S. Pat. No. 3,917,702 describes a stepwise process for preparing a polyaromatic amine epoxy curing agent that was readily blendable with epoxy resins and produced a cured resin having a higher heat distortion temperature than those cured with previously known polyaromatic amines. This process involved: (1) dissolving an aromatic polyamine in a solvent, (2) adding an active aldehyde compound to the solution in a mole ratio of polyamine to aldehyde in the range of from 0.75 to 5 and maintaining the temperature in the range from 25 to 100° C. until the reaction is complete, (3) removing the water from the reaction mixture, (4) adding an aromatic diamine in equal molar proportions to that used in the initial reaction in Steps 1 and 2, and (5) removing water formed in Step 4 by heating at reduced pressures to 150° C.

U.S. Pat. No. 3,459,781 discloses a method for producing liquid polyisocyanates that involves the production of a polyaromatic amine precursor. The polyaromatic amine precursor is produced in a step-wise reaction that consists of (1) reacting formaldehyde with an aromatic monoamine in the presence of a mineral acid catalyst, (2) after the reaction of Step 1 is complete, an aromatic diamine is added to the reaction mixture of Step 1 in such an amount as to be 3.3 to 80 mole percent of the aromatic monoamine of Step 1 and the reaction is continued below 50° C., (3) and heating the reaction product of Step 2 to at least 60° C. for a period of time sufficient to complete the reaction. Usually attempts to increase the heat distortion, or deflection, temperatures were accompanied by an increase in the working viscosity of the resin while curing. This adversely affects the utility of the material for many applications.

Similar methods for preparing a polyaromatic amine precursor for the preparation of liquid isocyanates may be found in U.S. Pat. Nos. 3,012,008; 3,492,251; 3,936,483; and 4,071,558.

SUMMARY OF THE INVENTION

It has now been found that a liquid methylene bridged polyaromatic amine curing agent is prepared by mixing and reacting a mixture of aniline, and from about two to about eight mole percent, preferably from about 3 to about 5 mole percent, of a mononuclear aromatic amine, having the amine groups bonded to nonadjacent positions in the aromatic ring, with formaldehyde in a mole ratio of total amine to formaldehyde of from about 2.5 to about 8. When used to cure a vicinal epoxide resin the resulting product had a surprising increased heat distortion temperature as compared to epoxy resins cured with a material prepared from aniline without the added diamine.

It was discovered that not all polyaromatic amine material so prepared would increase the heat distortion temperature of the cured resins. Surprisingly, only the materials prepared with a mononuclear aromatic amine having the amine groups bonded to nonadjacent positions on the aromatic ring gave higher distortion temperatures. Materials prepared with a mononuclear aromatic amine having adjacent amine groups resulted in significantly decreased heat distortion temperatures.

In accordance with this invention, the methylene bridged polyaromatic amine materials are prepared by facile one-step reaction, easily recovered, contain an isomer distribution that prevents crystallization thereby making them readily blendable with the vicinal epoxide resins, and provide cured resins with significantly improved heat distortion temperatures. Such resins are highly valuable products where the temperature surrounding their use is elevated.

DESCRIPTION OF THE PREFERRED EMBODIMENT

According to the preferred embodiment, the polyaromatic amine curing agents of this invention are prepared by mixing and reacting in a reaction vessel designed to withstand elevated pressures in the presence of a solid acidic catalyst at a temperature of from about 100° C. to about 300° C. under autogenous pressure, a mixture of aniline, and from about two to about eight mole percent, preferably from about 3 to about 5 mole percent, of a mononuclear aromatic diamine having amine groups attached to nonadjacent carbon atoms, with formaldehyde in a mole ratio of total amine to formaldehyde of from about 2.5 to about 8. All the reactants can be mixed simultaneously or the aniline and the diamine can be separately mixed and then reacted with the formaldehyde. The polyaromatic amine material may be recovered by stripping the reaction mixture of water, filtering out the solid catalyst and stripping the filtrate of excess aniline. The product mixture will generally contain about 39 to about 78 wt% dimer, about 17 to about to 25 wt% trimer and about 5 to about 36 wt% tetramer and higher polymers.

Suitable catalyst for use in the instant invention may be generically defined as a solid acidic siliceous catalyst, such as, for example, acid treated siliceous clays, silica alumina or silica-magnesia catalyst, as disclosed in U.S. Pat. Nos. 3,362,979 and 4,071,558, disclosure of which

EXAMPLE 8

As in Example 1, aniline (535.7 g, 5.76 moles) and m-phenylenediamine (25.9 g, 0.24 moles, or 5 mole % of the total amine charged) and formaldehyde (1.5 moles) and silica alumina (11.2 g) were reacted in a 1—1. autoclave and worked up as described in Example 1 to afford 254.0 g of product with 10.18 meq/g total titrable amine content. GPC indicated 57% dimer, 20% trimer, and 23% tetramer and heavier.

EXAMPLE 9

As in Example 1, aniline (635.0 g, 6.86 moles) and m-phenylenediamine (15.1 g, 0.14 moles, or 2 mole % of the total amine charged) and formaldehyde (1.4 moles) and silica alumina (13.1 g) were reacted in a 1—1. autoclave. Work up similar to that described in Example 1 afforded 223.6 g of product amine with 10.0 meq/g total titrable amine content and GPC indicated 68% dimer, 17% trimer, and 15% tetramer and heavier.

EXAMPLE 10

As in Example 1, aniline (638.0 g, 6.86 moles) and m-phenylenediamine (15.1 g, 0.14 mole, or 2 mole % of the total amine charged) and formaldehyde (1.17 moles) and silica alumina (13.1 g) were charged to a one liter. autoclave and reacted. Work up similar to that described in Example 1 afforded 189.9 g of product amine with 10.08 meq/g total titrable amine content and CPC indicated 69% dimer, 17% trimer, and 14% tetramer, and heavier.

To illustrate the advantage of the curing agents of this invention as prepared according to the above examples, various epoxy formulations employing diglycidyl ether of 4,4'-isopropylidene bisphenol having an epoxy equivalent weight of about 190 as the vicinal epoxide were cured with known methylene bridged polyamine curing agents and various of the curing agents of this invention. Three drops of silicone fluid were added to each formulation to prevent formation of voids and bubbles. After degassing under vacuum, the formulations were oven cured at the conditions indicated in aluminum molds. The cured products (⅛" thick) were subjected to standard American Society for Testing Materials (ASTM) tests for Izod impact strength (ASTM designation D-256), flexural strength and modulus of elasticity in flexure (ASTM designation D 790–66), tensile strength and elongation at break (ASTM designation D-638-64 T), deflection temperature (ASTM designation D-648-56) and hardness (ASTM designation D-2240-64 T). The tensile shear strength (ASTM D-1002-64) was measured on adhesive bonds. The abbreviations in the tables, pbw, psi and g. stand for parts by weight, pounds per square inch and grams, respectively.

Table 1 shows that epoxy resins cured with an effective amount of the polyaromatic amine materials of this invention, in addition to having higher heat distortion temperatures also have comparable or improved structural properties to those cured with a conventional polyaniline curing agent.

A series of tests were run using the curing agents of this invention as compared with the polyaniline curing agents of the prior art to demonstrate the improvement in the heat distortion, or deflection, temperature and at the same time show that the working viscosity of the resin is not unduly increased by the small amount of additive used in the practice of this invention. The data reported on Table 2 clearly demonstrate the advantages of this invention while, at the same time, providing important information to guide those skilled in the art in achieving the advantages of the invention.

TABLE 1

| Formulation: | | | | |
|---|---|---|---|---|
| Epoxy Resin (EEW 190) | 100 | 100 | 100 | 100 |
| JEFFAMINE AP-22[a] | 26 | | | |
| Polyaromatic amine | | | | |
| Example 2 | | 25.8 | | |
| Example 5 | | | 26.3 | |
| Example 7 | | | | 25.9 |
| Properties of ⅛" castings: | | | | |
| (cured 2 hrs. 80°, 3 hrs. 160° C.) | | | | |
| IZOD impact strength, ft-lbs/in | 0.29 | 0.48 | 0.30 | 0.34 |
| Tensile strength, psi. | 12,400 | 10,500 | 12,100 | 9,300 |
| Tensile modulus, psi. | 407,000 | 385,000 | 387,000 | 383,000 |
| Elongation at break, % | 4.4 | 3.7 | 5.4 | 3.1 |
| Flexural strength, psi. | 17,800 | 17,900 | 15,700 | 16,700 |
| Flexural modulus, psi. | 424,000 | 419,000 | 390,000 | 410,000 |
| HDT, °C., 264 psi/66 psi* | 136/139 | 141/149 | 148/154 | 154/160 |
| Shore D hardness, 0-10 sec. | 91–90 | 90–88 | 90–88 | 83–31 |

[a] a polyaromatic amine having a functionality of about 2.2 prepared by reacting aniline and formaldehyde in the presence of a silica alumina catalyst.
*HDT = heat deflection temperature

TABLE 2

| Diamine Added to Aniline | Sample[a] | Mole Ratio of Total Amine to Formaldehyde | Mole % of Diamine to Aniline | % Polymeric Distribution | | | Heat Distortion Temperature °C. 264 psi/66 psi | Working Viscosity, Brookfield cps R.T. |
|---|---|---|---|---|---|---|---|---|
| | | | | Dimer | Trimer | Higher | | |
| None (AP-22[c]) | — | — | — | 68 | 20 | 12 | 136/139 | 34,200 |
| 2,4 toluene-diamine | 1 | 2.5 | 5 | 50 | 25 | 25 | 143/152 | — |
| | 2 | 4 | 2 | 67 | 21 | 12 | 139/147 | 25,500 |
| | 3 | 4 | 4 | 64 | 22 | 14 | 141/149 | 33,000 |
| | 4 | 5 | 5 | 62 | 24 | 14 | 150/160 | 67,500 |
| | 5 | 6 | 5 | 65 | 25 | 10 | 145.5/154 | 46,800 |
| m-phenylene-diamine | 6 | 3.5 | 2 | 60 | 22 | 19 | 141/148 | — |
| | 7 | 4 | 2 | 62 | 20 | 18 | 149/154 | 33,250 | aldehyde, e.g., formaldehyde, and either a monohydric phenol, e.g. phenol itself, or a polyhydric phenol. Further details concerning the nature and preparation of these epoxy novolac resins can be obtained in Lee, H. and Neville, K. "Handbook of Epoxy Resins".

It will be appreciated by those skilled in the art that the polyepoxide compositions which can be cured according to the practice of the present invention are not limited to those containing the above described polyepoxides, but that these polyepoxides are to be considered merely as being representative of the class of polyepoxides as a whole.

The amount of curing agent which is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these polyepoxide-containing compositions prior to final cure. For example, in certain instances it may be desired to add minor amounts of other co-catalysts, or hardeners, along with the curing agent system herein described. Conventional pigments, dyes, fillers, flame retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, and where necessary.

This invention will be illustrated by the following examples and tables which are given by way of illustration and as limitations on the scope of this invention.

EXAMPLE 1

A 1-liter stainless steel autoclave was charged with 442.0 g (4.75 moles) of aniline containing 30.5 g of 2,4-toluenediamine (0.25 mole). The molar percent of 2,4-toluenediamine in aniline is 5 mole %. The aniline and toluenediamine was followed by 150 ml of 37% formalin (2.0 moles of formaldehyde) and 9.6 of Aerocat® silica-alumina (American Cyanamid Co.). The reaction mixture was heated to 200° C. with stirring and held there for 2.0 hours at autogenous pressure (~250-260 psig). The reaction mixture was cooled, stripped of water, filtered and stripped of excess aniline. The product amine had a total titratable amine content of 9.93 meq/g and a tertiary amine content of only 0.08 meq/g. The NMR spectrum indicated the absence of N-benzylic type secondary amine protons and the gel permeation chromatograph indicated 50% dimer, 25% trimer, and 25% tetramer, pentamer and heavier. The GLC (gas-liquid Chromatography) indicated 47.0 wt. % methylene dianiline (or dimer) and the isomer distribution in the dimer portion was observed to be 2.7% 2,2'-isomer, 27.3% of the 2,4'-isomer, 66.3% of the 4,4'-isomer, and 3.7% of N-methyl containing dimeric product.

EXAMPLE 2

As described in Example 1, aniline (546.8 g, 5.88 moles) and 2,4-toluenediamine (14.6 grams, 0.12 moles, 2.0 mole % basis total amine charged) and formaldehyde (1.5 moles) as formalin and 11.3 g of silica alumina were charged to a 1—1. autoclave and heated to 200° C. and held there for 2.0 hrs. Work-up, as described previously in Example 1, afforded product amine with 10.10 meq/g total titratable amine content and tertiary amine content of only 0.047 meq/g. GPC (gel permeation chromatography) indicated 67% dimer, 21% trimer and 12% tetramer and heavier. GLC indicated 64.8 wt. % dimer and of the dimer portion the 4,4'-isomer content was 68.2 wt. %. The NMR spectrum indicated the absence of secondary N-benzyl type protons. The weight of product amine isolated was 265.0 grams.

EXAMPLE 3

As in Example 1, aniline (535.7 g or 5.76 moles) and 2,4-toluenediamine (29.3 g or 0.24 moles, 4.0 mole % basis total amine charged) and formaldehyde (1.5 moles) and silica alumina (11.3 g) were added to the autoclave and heated with stirring to 200° C. and held there for 2 hours. Work-up, as in Example 1, afforded 248.0 g. product amine with 10.2 meq/g total titrable amine content and GPC distribution of 64% dimer, 22% trimer and 14% tetramer and heavier. GLC indicated the isomer distribution in the dimer portion to be 68.4%, 4,4'-isomer.

EXAMPLE 4

As in Example 1, aniline (618 g, 6.65 moles) and 2,4-toluenediamine (42.8 g, 0.35 moles or 5 mole % basis total amine charged) and formaldehyde (1.4 moles) and silica alumina (13.2 ) were charged to that autoclave. After reaction and work-up, as described in Example 1, the product amine (233.6 g) was found to contain 10.49 meq/g total titrable amine content. GPC indicated 62% dimer, 24% trimer, and 14% heavier. GLC indicated the dimer portion contained approximately 70.3% 4,4'-isomer content.

EXAMPLE 5

Aniline (618 g, 6.65 moles) and 2,4-toluene diamine (42.8 g, 0.35 moles or 5 mole % basis total amine charged) and formaldehyde (1.17 moles) and silica alumina (13.2 g) were charged to a 1—1. autoclave and reacted as described in Example 1. After work-up as described in Example 1, the product amine was found to contain 10.65 meq/g total titrable amine content and GPC indicated some 66% dimer, 25% trimer, and 10% tetramer and heavier. Of the dimer portion some 71.0% was the 4,4'-isomer.

EXAMPLE 6

As in Example 1, aniline (638 g, 6.86 moles) and m-phenylenediamine (15.1 g, 0.14 moles or 2 mole % of the total amine charged) and formaldehyde (2.0 moles) and silica alumina (9.8 g) were reacted and worked up as described in Example 1 affording 300.0 g product amine possessing a total titrable amine content of 9.85 meq/g. GPC indicated 60% dimer, 21% trimer, and 19% tetramer and heavier.

EXAMPLE 7

As in Example 1, aniline (546.8 g, 5.88 moles) and m-phenylenediamine (13.0 g, 0.12 moles or 2 mole % of the total amine charged) and formaldehyde (1.5 moles) and silica alumina (11.2 g) were reacted in a 1—1 autoclave and worked up to afford product amine weighing 191.4 g. The product amine contained 10.0 meq/g total titrable amine content and GPC indicated 62% dimer, 20% trimer and 18% tetramer and heavier.

TABLE 2-continued

| Diamine Added to Aniline | Sample[a] | Mole Ratio of Total Amine to Formaldehyde | Mole % of Diamine to Aniline | % Polymeric Distribution | | | Heat Distortion Temperature °C. 264 psi/66 psi | Working Viscosity, Brookfield cps R.T. |
|---|---|---|---|---|---|---|---|---|
| | | | | Dimer | Trimer | Higher | | |
| 8 | 4 | 4 | 57 | 20 | 23 | 154/160 | 43,500 | — |
| | 9 | 5 | 2 | 68 | 17 | 15 | 143/151 | 24,250 |
| | 10 | 6 | 2 | 69 | 17 | 14 | 148/156 | 40,600 |
| 2,6-toluene diamine | 11 | 3 | 2 | 61 | 24 | 15 | 142/150 | — |
| | 12 | 3 | 4 | 62 | 25 | 13 | 143/151 | — |
| | 13 | 4 | 2 | 71 | 22 | 8 | 143/149 | — |
| | 14 | 4Z | 4 | 70 | 21 | 9 | 143/150 | — |
| p-phenylene-diamine | 15 | 4 | 2 | 73 | 20 | 7 | 140/147 | 33,500 |
| | 16 | 4 | 4 | 73 | 20 | 7 | 140/147 | 23,750 |
| | 17 | 5 | 2 | 78 | 17 | 5 | 141/146 | 18,200 |
| | 18 | 5 | 5 | 77 | 17 | 5 | 144/152 | 19,000 |
| | 19 | 5 | 8 | 76 | 18 | 6 | 148/155 | 26,000 |
| None (UP-27[d]) | — | — | — | 50 | 25 | 25 | 135/139 | — |

[a]Samples 1-10 correspond to the materials produced in Examples 1-10, respectively; samples 11-19 were prepared in accordance with the procedure of Example 1 except for variation in the mole ratio of total amine to formaldehyde and mole percent of diamine to aniline, which are indicated in the table.
[b]Epoxy resin used had an epoxy equivalent weight (EEW) of 190; test perfromed on ⅛″ casting cured 2 hrs. at 80° C./3 hrs. at 160° C.
[c]AP-22, is JEFFAMINE[R] AP-22, a polyaromatic amine prepared with aniline and formaldehyde to have an amine functionality of about 2.2 (Jefferson Chemical Company, Inc.).
[d]AP-27, JEFFAMINE[R] AP-27, is a polyaromatic amine prepared with aniline formaldehyde to have an amine functionality of about 2.7 (Jefferson Chemical Company, Inc.).

A comparison of Table 3 with Table 2 illustrates the effect on the heat distortion temperature of a vicinal epoxide cured with a polyaromatic amine material produced using a diamine having amine groups on adjacent ring positions. It also illustrates that a mere increase in the functionality of a polyaromatic amine does not, by itself, lead to an increased heat distortion temperature of a cured resin.

TABLE 3

| Diamine Added to Aniline | Sample[a] | Mole Ratio of Total Amine to Formaldehyde | Mole % of Diamine to Aniline | % Polymeric Distribution | | | Heat Distortion Temperature °C. 264 psi/66 psi | Working Viscosity Brookfield cps R.T. |
|---|---|---|---|---|---|---|---|---|
| | | | | Dimer | Trimer | Higher | | |
| None (AP-22) | — | — | — | 68 | 20 | 12 | 136/139 | 34,200 |
| 3,4 toluene diamine | 20 | 3 | 2 | 67 | 24 | 9 | 139/144 | — |
| | 21 | 3 | 4 | 70 | 22 | 8 | 124/131 | — |
| | 22 | 4 | 2 | 75 | 19 | 6 | 131/136 | — |
| | 23 | 4 | 4 | 80 | 17 | 3 | 124/129 | — |
| o-phenylene-diamine | 24 | 3 | 2 | 65 | 23 | 12 | 135/142 | — |
| | 25 | 3 | 4 | 69 | 22 | 9 | 125/134 | — |
| | 26 | 4 | 2 | 75 | 19 | 6 | 132/139 | — |
| | 27 | 4 | 4 | 78 | 17 | 5 | 116/123 | 11,800 |
| | 28 | 5 | 2 | 81 | 15 | 4 | 123/130 | 13,500 |
| | 29 | 5 | 5 | 87 | 11 | 2 | 110/115 | 14,300 |
| | 30 | 5 | 8 | 81 | 14 | 5 | 110/115 | 12,600 |

[a]Samples 20-30 were prepared in accordance with the procedure of Example 1.

While the invention has been explained in relationship to its preferred embodiment, it is to be understood that various modifications thereof may become apparent to those skilled in the art upon reading the specifications and the invention is intended to cover such operable modifications as fall within the scope of the appended claims.

We claim:

1. A curable epoxy resin composition consisting essentially of:
   a vicinal epoxide; and, an effective amount of a methylene bridged polyaromatic amine curing agent prepared by the steps of mixing and reacting, in the presence of a solid acidic catalyst, at a temperature of from about 100° C. to about 300° C., (1) an aniline, (2) a mononuclear aromatic diamine having amine groups bonded to nonadjacent carbon atoms of the aromatic ring; and (3) formaldehyde; wherein the amount of the mononuclear aromatic diamine present is from about 2 mole percent to about 8 mole percent, based upon the total amine charged, and the mole ratio of the total amine charged to formaldehyde is from about 2.5 to about 8; to produce a methylene bridged polyaromatic amine material;
   whereby, when such composition is cured, an epoxy resin having improved heat distortion temperature is obtained.

2. The curable resin of claim 1, wherein:
   the mononuclear aromatic diamine is a phenylene diamine or an alkyl monosubstituted phenylene diamine wherein the alkyl substituent has from 1 to about 4 carbon atoms.

3. The curable resin of claim 2, wherein:
   the mononuclear aromatic diamine is m-phenylenediamine, p-phenylenediamine, 2,4-toluenediamine, 2,6-toluenediamine or mixtures thereof.

4. The curable resin of claim 1, wherein:
   the amine mixture contains from about 3 to about 5 mole percent of the mononuclear aromatic diamine.

5. A cured epoxy resin composition having improved heat distortion temperatures prepared by;
   mixing at least one vicinal epoxide resin containing an average of more than one 1,2-epoxide group per molecule; and, an effective amount of a polyaromatic amine curing agent prepared by the steps of mixing and reacting, in the presence of a solid acidic catalyst, at a temperature of from about 100° C. to about 300° C. (1) aniline, (2) a mononuclear aromatic diamine having amine groups bonded to nonadjacent carbon atoms of the aromatic ring, and (3) formaldehyde wherein the amount of the mononuclear aromatic diamine present is from about 2 mole percent to about 8 mole percent, based upon the total amine charged, and the mole ratio of the total amine charged to formaldehyde is from about 2.5 to about 8, to produce a methylene bridged polyaromatic amine material and recovering the methylene bridge polyaromatic amine material;

and heating the mixture of epoxide and curing agent at curing temperatures until cured.

6. The cured epoxy resin of claim 5, wherein:
the mononuclear aromatic diamine is a phenylene diamine or an alkyl monosubstituted phenylene diamine wherein the alkyl substituent has from 1 to about 4 carbon atoms.

7. The cured epoxy resin of claim 6, wherein:
the mononuclear aromatic diamine is m-phenylenediamine, p-phenylenediamine, 2,4-toluenediamine, 2,6-toluenediamine or mixtures thereof.

8. The cured epoxy resin of claim 5 wherein:
the amine mixture contains from about 3 to about 5 mole percent of the mononuclear aromatic diamine.

9. In a method for preparing liquid aromatic polyamine curing agents for epoxide resins by reacting an aniline with formaldehyde in the presence of a solid catalyst at a temperature of from about 100° C. to about 300° C. and recovering the curing agent, the improvement which comprises:
mixing with the aniline, prior to reaction with the formaldehyde, a mononuclear aromatic diamine with amine groups on nonadjacent carbon atoms to form an amine mixture in an amount such that the diamine is from about 2 to about 8 mole percent of the amine mixture whereby the recovered aromatic amine curing agent imparts improved heat distortion temperatures to cured epoxy resins when used in effective amounts for curing.

10. The method of claim 9, wherein:
the mononuclear aromatic diamine is a phenylene diamine or an alkyl monosubstituted phenylene diamine wherein the alkyl substituent has from 1 to about 4 carbon atoms.

11. The method of claim 10, wherein:
the mononuclear aromatic diamine is m-phenylenediamine, p-phenylenediamine, 2,4-toluenediamine, 2,6-toluenediamine or mixtures thereof.

12. The method of claim 9 wherein:
the amine mixture contains from about 3 to about 5 mole percent of the mononuclear aromatic diamine.

13. A methylene bridged polyaromatic amine material for curing vicinal epoxy resins to improve the heat distortion temperature of the cured resin prepared by mixing and reacting, in the presence of a solid acidic catalyst at a temperature of from about 100° C. to about 300° C. (1) aniline, (2) a mononuclear aromatic diamine, having the amine groups bonded to nonadjacent carbon atoms of the aromatic ring, and (3) formaldehyde; wherein the amount of the mononuclear aromatic diamine present is from about 2 mole percent to about 8 mole percent, based upon the total aniline charged, and the mole ratio of the total amine charged to formaldehyde is from about 2.5 to about 8 to produce a methylene bridged polyaromatic amine material and recovering the methylene bridged polyaromatic amine material, said material being comprised of a mixture including about 39% to about 78%, by weight, of a dimeric material, from about 17% to about 25%, by weight, of a trimeric material and from about 5% to about 36%, by weight, of tetrameric or higher polymer material.

14. The curing agent for vicinal epoxy resins of claim 13, wherein:
the mononuclear aromatic diamine is a phenylene diamine or an alkyl monosubstituted phenylene diamine wherein the alkyl substituent has from 1 to about 4 carbon atoms.

15. The curing agent for vicinal epoxy resins of claim 14, wherein:
the mononuclear aromatic diamine is m-phenylenediamine, p-phenylenediamine, 2,4-toluenediamine, 2,6-toluenediamine, or mixtures thereof.

* * * * *